US008363117B2

(12) United States Patent
Trumbull et al.

(10) Patent No.: US 8,363,117 B2
(45) Date of Patent: Jan. 29, 2013

(54) METHOD AND APPARATUS FOR PHOTOGRAPHING AND PROJECTING MOVING IMAGES

(75) Inventors: Douglas H. Trumbull, Southfield, MA (US); Barnaby Jackson, Providence, RI (US)

(73) Assignee: Showscan Digital LLC, Beverly Hills, CA (US)

( * ) Notice: Subject to any disclaimer, the term of this patent is extended or adjusted under 35 U.S.C. 154(b) by 378 days.

(21) Appl. No.: 12/759,128

(22) Filed: Apr. 13, 2010

(65) Prior Publication Data

US 2010/0259627 A1 Oct. 14, 2010

Related U.S. Application Data

(60) Provisional application No. 61/168,684, filed on Apr. 13, 2009.

(51) Int. Cl.
*H04N 5/228* (2006.01)
(52) U.S. Cl. ..................................... 348/208.4
(58) Field of Classification Search .................. None
See application file for complete search history.

(56) References Cited

U.S. PATENT DOCUMENTS

| 1,815,455 A | 7/1931 | Waller | |
|---|---|---|---|
| 4,477,160 A * | 10/1984 | Trumbull | 352/40 |
| 5,627,614 A | 5/1997 | Weisgerber | |
| 5,659,382 A * | 8/1997 | Rybczynski | 352/46 |
| 5,841,439 A | 11/1998 | Pose et al. | |
| 2006/0274031 A1 | 12/2006 | Yuen et al. | |
| 2008/0007614 A1 | 1/2008 | Mizuhashi et al. | |
| 2008/0131030 A1 | 6/2008 | Tokutomi et al. | |
| 2008/0266522 A1 * | 10/2008 | Weisgerber | 352/40 |
| 2009/0027549 A1 | 1/2009 | Weisgerber | |
| 2009/0244300 A1 * | 10/2009 | Levin et al. | 348/208.5 |

FOREIGN PATENT DOCUMENTS

EP 1040655 10/2000

OTHER PUBLICATIONS

International Search Report from PCT/US2010/0001086 dated May 27, 2010.
Supplementary European Search Report dated Sep. 19, 2012.

* cited by examiner

*Primary Examiner* — Luong T Nguyen
(74) *Attorney, Agent, or Firm* — McCormick, Paulding & Huber LLP

(57) ABSTRACT

A digital cinematographic and projection process that automatically adjusts for object motion within motion pictures in order to eliminate blur while increasing perceived impact of fast motion. The process includes, capturing an image having static and moving elements at a first frame rate, analyzing the image for motion/velocity components to detect the fast moving elements, reducing the static elements to a second frame rate, the second frame rate being slower than the first frame rate and retaining the fast moving element at the first frame rate.

20 Claims, 10 Drawing Sheets

METHOD AND APPARATUS FOR PHOTOGRAPHING AND PROJECTING MOVING IMAGES

CROSS REFERENCE TO RELATED APPLICATIONS

This application claims the benefit of U.S. Provisional Application Ser. No. 61/168,684, filed on Apr. 13, 2009, hereby incorporated by reference in its entirety.

FIELD OF THE INVENTION

The present invention relates to motion picture photography generally and, more particularly, to digital motion picture photography with image motion and blurring eliminated.

BACKGROUND OF THE INVENTION

Motion picture photography and projection is commonly accomplished via a series of still photographs on a strip of sprocketed celluloid film. In the camera, conventions of the motion picture industry call for a standardized frame rate of 24 frames per second, most commonly photographed using a rotating shutter in the camera such that during 360 degrees of shutter rotation, half of the time ($1/48^{th}$ of a second) the shutter is open while the film is held fixed in the camera aperture, and the other half of the time the shutter is closed in order for a mechanical movement to transport the film to the next frame, utilizing the perforations on the film to register to either sprockets or claws to move the film as well as hold it in position during each exposure.

For projection, the same frame rate of 24 is used, however the shutter speed is doubled, so that each frame of film is shown twice before proceeding to the next frame. The shutter is often called a "butterfly", having two openings of 90 degrees each, and two closures of 90 degrees each, thus still rotating at 360 degrees per frame. During one of the shutter closures the film is advanced to the next frame using a mechanical Geneva mechanism, or sometimes a low inertia electric stepper motor. The reason for the double shuttering, which creates a 48 cycle-per-second rate, is to reduce objectionable perceived flicker of the image on the screen, which is limited in brightness to not more than 16 foot lamberts. Projection brighter than 16 foot lamberts reintroduces objectionable perceived flicker.

An objectionable artifact of this double-shuttering of each image frame is a substantial loss of motion continuity due to the fact that the image does not contain new motion position on each flash, resulting in a stroboscopic effect retained in the human retina.

It is common knowledge amongst cinematographers, directors, and editors that frame-to-frame object or image motion must be substantially limited in order to avoid objectionable blurring or strobing. Blurring results from object/image motion that occurs during the shutter opening of $1/48^{th}$ of a second. Strobing occurs when the image displacement from one frame to the next becomes so great that the eye cannot integrate the sequence of frames into a smooth motion. Screen size is considered a limitation, since frame-to-frame image displacement can become quite objectionable on large screens due to angular displacement of frames on fast action. IMAX is a good example of this phenomenon, and IMAX films routinely slow their camera and object motion in order to avoid objectionable blurring and strobing.

Another shortcoming of the 24 frame standard is that when projecting a 3D movie, which includes two simultaneous projections of left and right eye imagery, if the motion displacement or blur between frames exceeds the displacement between right and left eye convergence angles, the 3D effect is lost and is overcome by blurring and strobing of the image.

An earlier invention and patent for the Showscan system disclosed the photographing and projecting of motion pictures at sixty frames per second. See U.S. Pat. No. 4,477,160, incorporated herein by reference in its entirety. The Showscan system resulted in a solution for the above shortcomings of conventional film, while demonstrably increasing a sense of "liveness" and audience stimulation. Each frame was shown only once, thus not using a double-bladed shutter, and at a shutter opening of $120^{th}$ of a second, blurring of the recorded image was substantially reduced. At a projection rate of 60 frames per second, there was no apparent flicker at any increased screen brightness, and there was no discontinuity of motion. 3D films photographed and projected in Showscan had no objectionable object/image motion limitations that would adversely affect the 3D illusion.

Nevertheless, worldwide motion picture audiences are accustomed to the 24 frames per second standard, and would find that Showscan is similar to a live broadcast of news or sports, since television is often captured and shown at a rate of 60 interlaced frames. So 24 fps is accepted as a "cinema texture", while 60 fps would be seen as a "television texture".

The present invention is intended to take advantage of emerging digital technologies of electronic cinematography and digital projection, which no longer requires adherence to old film-based limitations. In fact, the entire idea of "frames" as individual still photographs projected in rapid succession can now be revised to a new concept of overall fluid image flow. Since the photographed and projected image is, in fact, a matrix of "pixels" at various resolutions, it is now possible to consider a more fluid manner of capturing and projecting imagery on a pixel-by-pixel basis, rather than a frame-by-frame basis. For example, a scene may be digitally photographed without any camera motion whatsoever, thus the overall background would have little or no overall motion. In the foreground, however, a person may be engaged in fighting with another—a common occurrence in movies. Parts of that person, depending upon motion/velocity parameters, may be blurred. A fist, traveling at very high velocity across the screen may be blurred beyond recognition for a number of frames; a face may be blurred beyond recognition as well, as it turns rapidly after the supposed impact (the lack of which has been totally obscured by loss of image clarity). Critical visual information has been lost forever. Sometimes the camera may be moving, as in an exciting car chase sequence, and virtually everything in the frame may be blurred to some degree, often for many frames in a sequence. The result is the visual loss of the very impact that the filmmaker and movie-goer are hoping to experience.

In fact, filmmakers often desire to include in their films as much action as possible in order to instill a sense of participation and excitement in viewers. Yet, a tremendous amount of this action is lost in blur. And in 3D, the image may lose all sense of stereoscopic dimension due to both blur and strobing.

In view of the above, there is a need for an apparatus and method for increasing the clarity and impact of fast action elements of a scene while at the same time preserving the world standard of 24 frame film texture.

SUMMARY OF THE INVENTION

In view of the foregoing, it is an object of the present invention to provide a method and apparatus for photographing and projecting moving images.

It is another object of the present invention to provide a method and apparatus for photographing and projecting moving images that retains critical visual information.

It is another object of the present invention to provide a method and apparatus for photographing and projecting moving images that minimizes blurring of recorded images.

It is another object of the present invention to provide a method and apparatus for photographing and projecting moving images that increases the clarity and impact of fast action elements while preserving the world standard of 24 frame film texture.

It is another object of the present invention to provide a method and apparatus for photographing and projecting moving images that reduces motion displacement and blur between frames.

It is another object of the present invention to provide a method and apparatus for photographing and projecting moving images in which strobing is substantially reduced or eliminated.

It is another object of the present invention to provide a method and apparatus for photographing and projecting moving images in which a sense of stereoscopic dimension in such images is retained.

It is yet another object of the present invention to provide a digital cinematographic and projection process that automatically adjusts for object motion within motion pictures in order to eliminate blur while increasing perceived impact of fast motion.

It is another object of the present invention to provide a digital cinematographic and projection process that results in increased audience excitement and stimulation.

According to the present invention a method and apparatus for photographing and projecting moving images is provided. The method and apparatus of the present invention corrects object/image motion and blurring at the camera via means of detecting motion and compensating for such motion by increasing the update rate of pixels associated with the such object/image, while leaving other areas of the frame at a conventional update rate of 24 frames per second.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
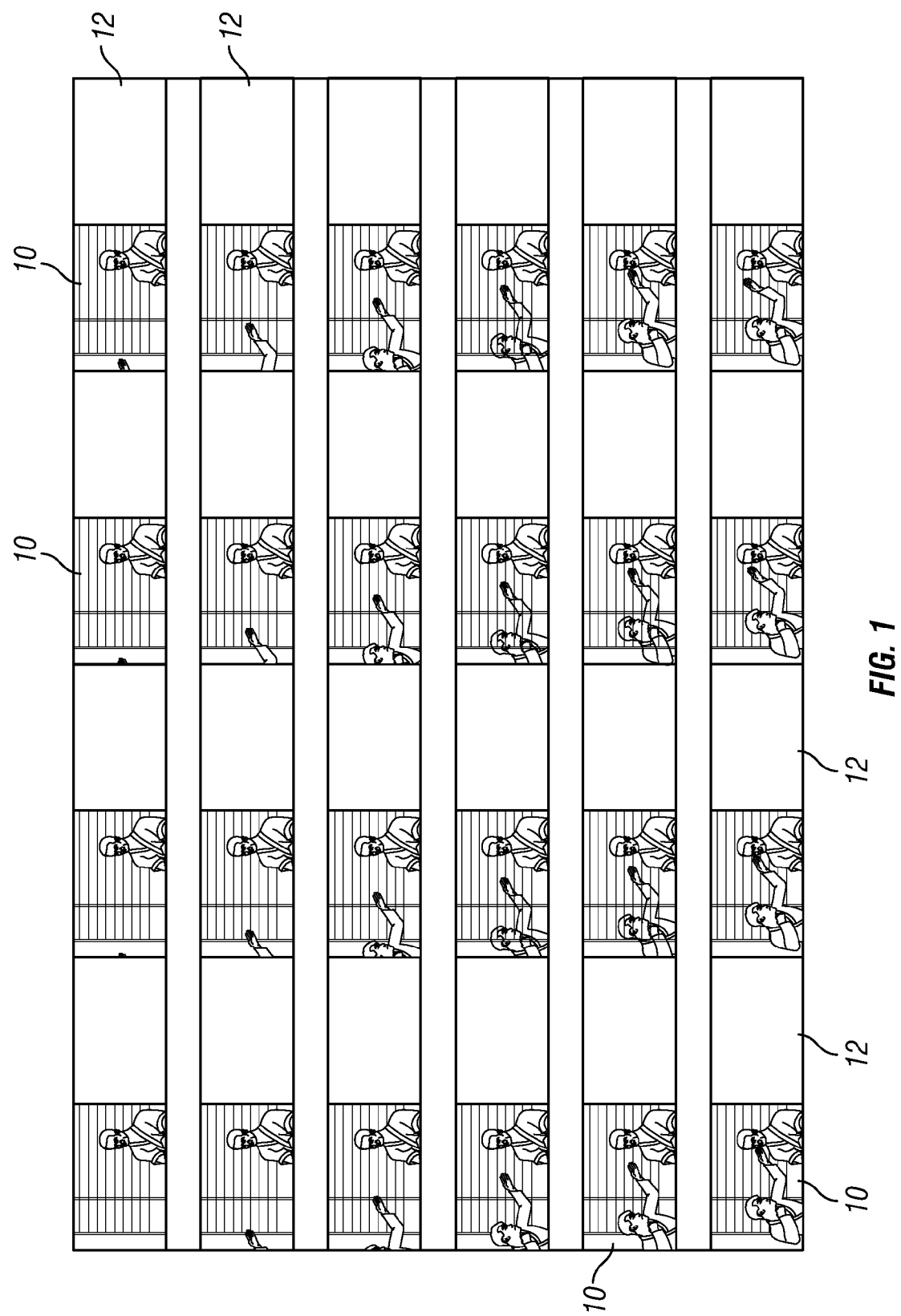
FIG. 1 shows a timeline representing one second of filming divided into 24 frames with 24 shutter closures.

As discussed above, FIG. 1 illustrates the 24 frame per second industry standard film convention. As shown therein, the one second timeline consists of twenty-four frames 10 and twenty-four shutter closings 12. When filming at 24 frames per second, half the time the camera shutter is closed and the other half of the time the shutter is open, resulting in half of the action being lost forever. The action is simply not recorded when the shutter is closed. As discussed above, filming and projecting at 24 frames per second often results in blurring and/or strobing of fast moving objects or image elements. This is extremely undesirable and is often objectionable to the audience. Additionally, the audience is not able to see a clear picture of the action at the moment that the audience is fully engaged by such action.

Due to electronic cinematography and advancements therein, however, it is no longer necessary to simply think of a movie as a rigid series of photographs. Indeed, turning now to FIG. 2, the same one second timeline of a scene shot at 120 frames per second is shown. Here, the one second period is divided into one hundred and twenty frames 14 without any shutter closings. As will be readily appreciated, substantially all of the action is recorded as compared to the same scene shot at 24 frames per second.

According to a one embodiment of the present invention, the present invention intends to correct object/image motion and blurring at the digital camera, via means of automatically detecting sudden variations in pixel values, thus detecting motion and compensating for such motion by increasing the update rate of those pixels concerned—while leaving other areas of the "frame" at a conventional update rate of 24 frames per second, as discussed in detail below. In this way, fast moving image elements such as a fist or explosion would be automatically detected and captured at a higher pixel update rate commensurate with velocity. The pixels in those areas would be updated at increasingly faster temporal rates, resulting in reduced or eliminated blur, thus delivering to viewers an accurate depiction of the actual motion that occurred at that moment. In digital projection, where image elements such as pixels are changed from one state of color and brightness to the next, the process is repeated, thus delivering to viewers a substantially more accurate portrayal of fast action, while still adhering to the "cinema texture" that audiences expect.

Existing digital projection systems already include 120 cycles-per-second flash rates, thus showing each of the 24 frames five times. Some projectors run at 144 fps. This eliminates flicker and makes possible substantially increased screen brightness.

Figure 2:
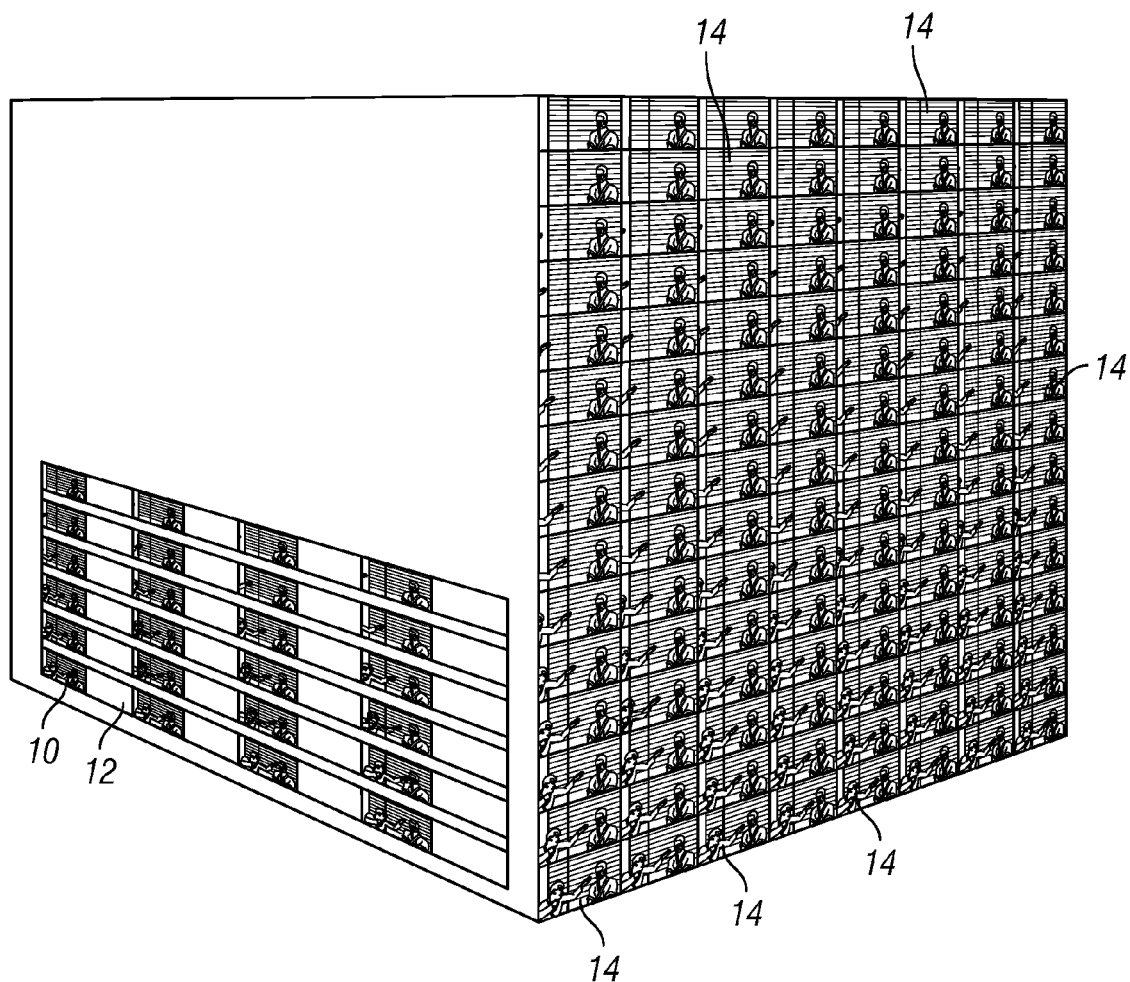
FIG. 2 shows the same timeline as FIG. 1, divided into 120 frames without any shutter closures.
Figure 11:
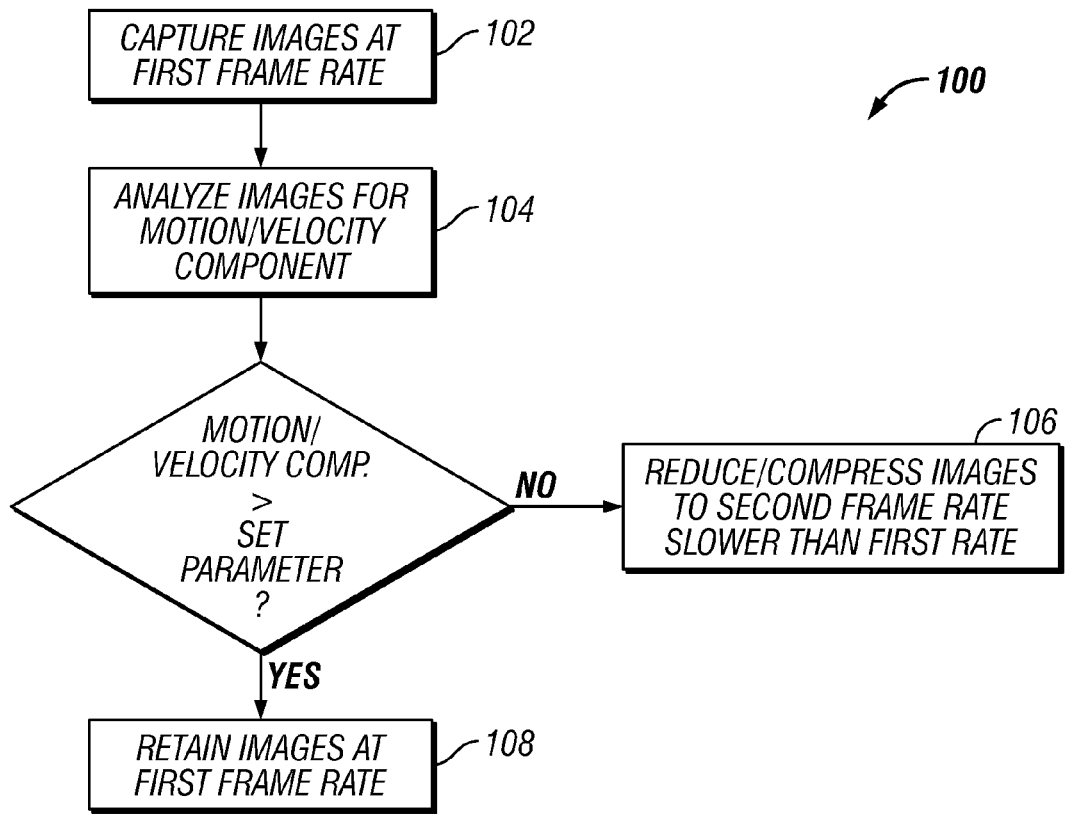
FIG. 11 is a schematic diagram illustrating a process for photographing moving images in accordance with the present invention.

FIG. 11 illustrates a process 100 for photographing and projecting moving images, in accordance with one embodiment of the present invention. As shown therein, it is anticipated that in step 102, photography will occur at some predetermined "frame rate" that is considered more than adequate to capture clear and unblurred image information. This could possibly be 60 frames per second, or even 120 frames per second, using existing high-speed digital cameras, and possibly using substantially greater shutter openings offered by this technology. An example of a scene shot at 120 frames per second is shown in FIG. 2. Subsequent to photography, in step 104, frames would be analyzed for motion/velocity components and then portions of the image area would be blended or kept separate as needed for various circumstances of fast or slow motion. In this way, slow moving areas of the image would be reduced back to 24 frames per second in step 106, while other faster moving image objects would contain faster pixel update rates (step 108) in order to preserve image clarity and impact.

Importantly, the present invention contemplates recording motion at the highest possible rate to capture as much of the action as possible, and then uses image processing at the camera, and/or in post-production, to balance the clarity of high speed digital image capture with the cinematic look and feel of 24 fps film.

Figure 3:
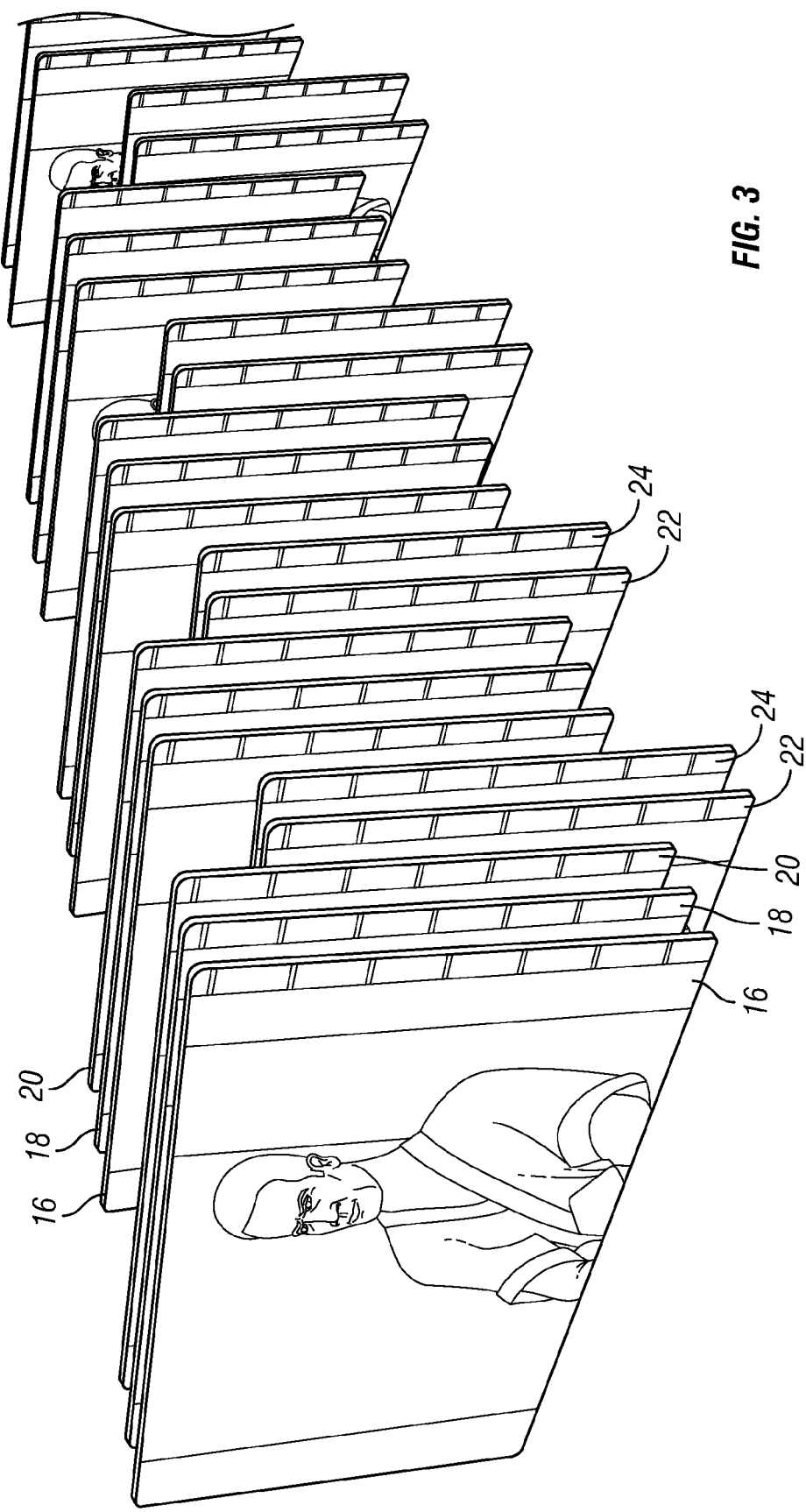
FIG. 3 illustrates a process of deriving a 24 frame per second film from a 120 frame per second source in accordance with the present invention.
Figure 4:
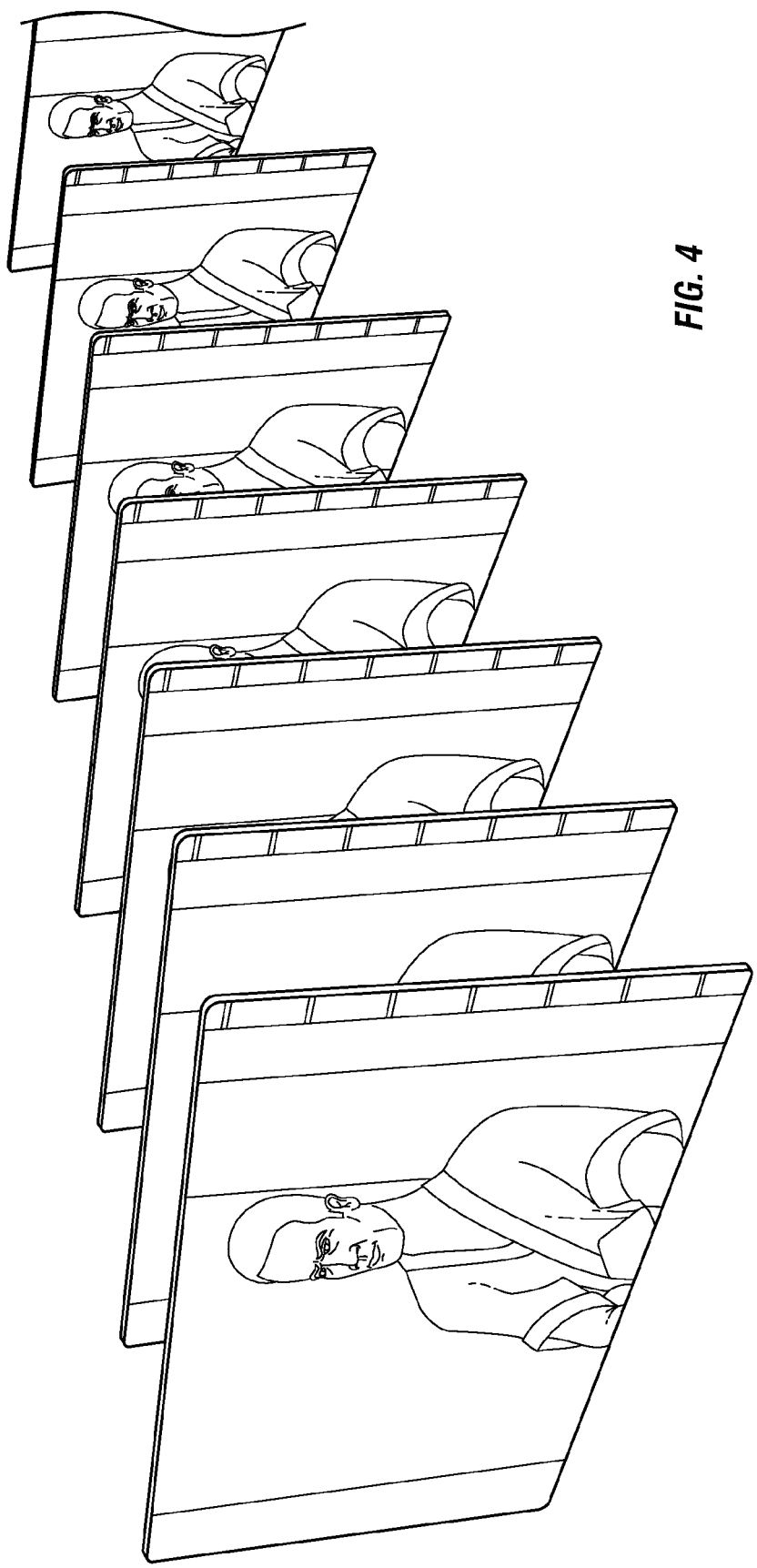
FIG. 4 shows the 24 frame film as a result of the process of FIG. 3 in accordance with the present invention.

An example of this process would be to shoot at 120 frames per second with a shutter opening of 359 degrees, which is possible with certain digital cameras. In this way, each frame would have an exposure of almost exactly 1/120$^{th}$ of a second, resulting in little blur on each frame. Again, an example of a scene shot at 120 frames per second is shown in FIG. 2. Turning now to FIG. 3, by digitally combining three of these frames 16,18,20 in sequence, by various means known in the art, such as superimposition, and then deleting the next two frames 22,24, the result would be a 24 frame film that would be almost indistinguishable from the same image shot originally at 24 frames per second. FIG. 4 illustrates the 120 frame per second film after it has been compressed according to the process illustrated in FIG. 3.

As will be readily appreciated, when a film is shot at 120 frames per second, and then processed such that 3 frames are combined and 2 dropped, a 24 frame per second film stream that has "film" texture is produced. This is possible because the shutter is open all the time (359 degrees) and so the retained frames, when blended, have the motion data that would have been recorded at 24 frames per second. Accordingly, the frames are blended as a group of three that represents a simulated 24 frame per second captured moment. The critical factor is that the discreet motion data from each frame, originally at 120 frames per second, is additive in the creation of the new blended frame. This provides the film texture, and the film look, that is desired.

Moreover, because frames are blended to make a final film, the final look of the film and the interpolation of motion can be adjusted, with more or less blur, to achieve the desired results. This adjustment of the 24 frame per second film stream is only the first part of the process. The motion data from a 60 frame per second stream and a 120 frame per second stream can be used as well to enhance sharpness, provide detail, and improve the overall look of the film.

Figure 5:
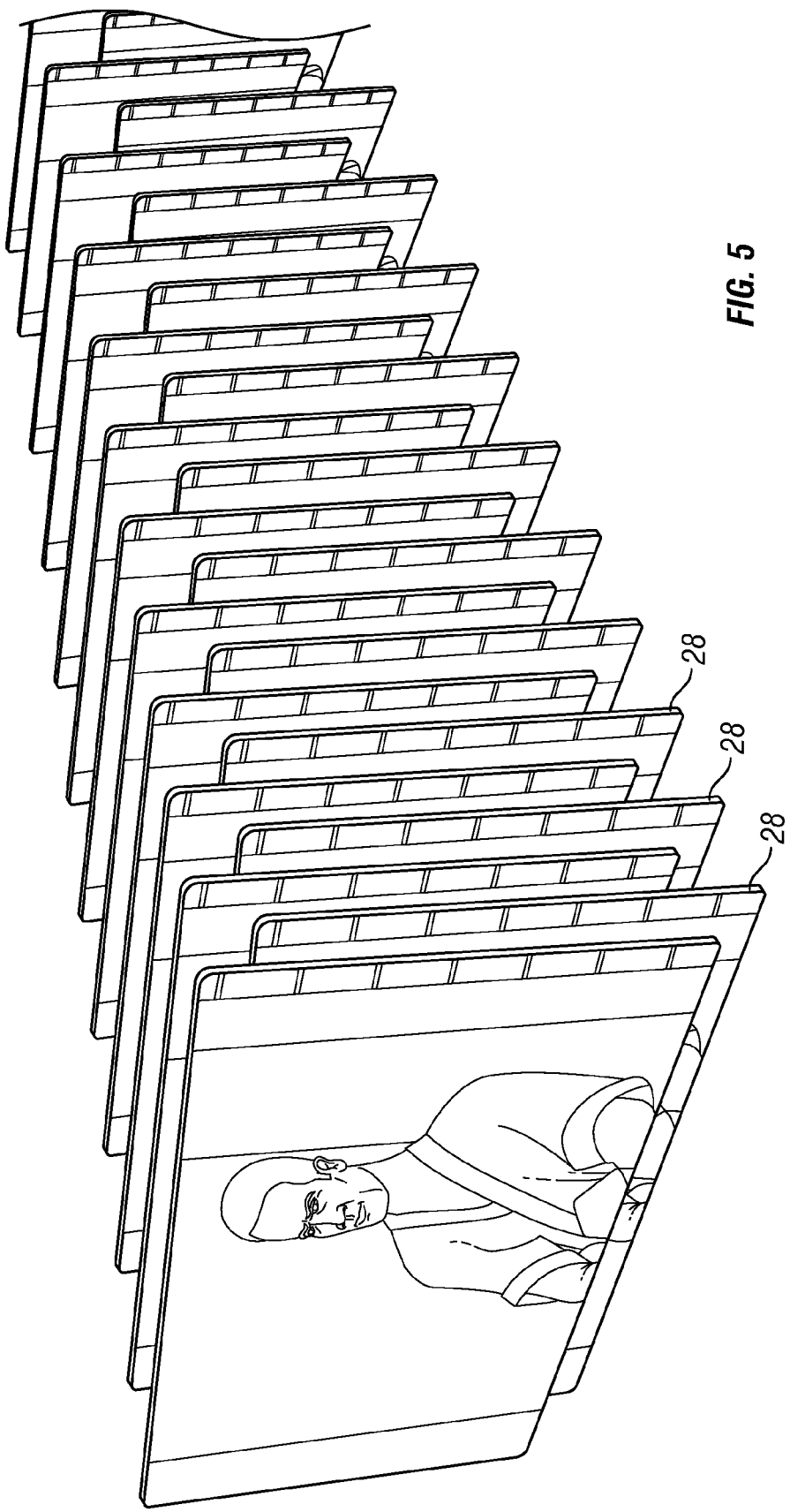
FIG. 5 illustrates a process of deriving a 60 frame per second film from a 120 frame per second source in accordance with the present invention.

Importantly, in connection with the above-described blending process, there are several ways to combine and delete frames in various sequences that are even divisions of 120, such as 60, 40, and 30 as well as 24. For example, FIG. 5 shows the compression of a 120 frame film, in which every other frame 28 is deleted, resulting in a 60 frame film. By retaining unblurred but fast moving image elements as needed, while reducing other slow moving or static image areas to 24, the result would appear to be a standard "cinema texture" film, with unblurred fast moving components (fist, explosion, etc.).

Another version of the above would be to start with a 100 frame per second rate, then divide to 75, 50, and 25 fps. As discussed in detail below, a later iteration of the invention would be the fabrication of a digital camera technology that includes within it the appropriate motion detection methodologies in the form of algorithms and circuits within the camera that automatically perform the appropriate image compression, as described.

Figure 6:
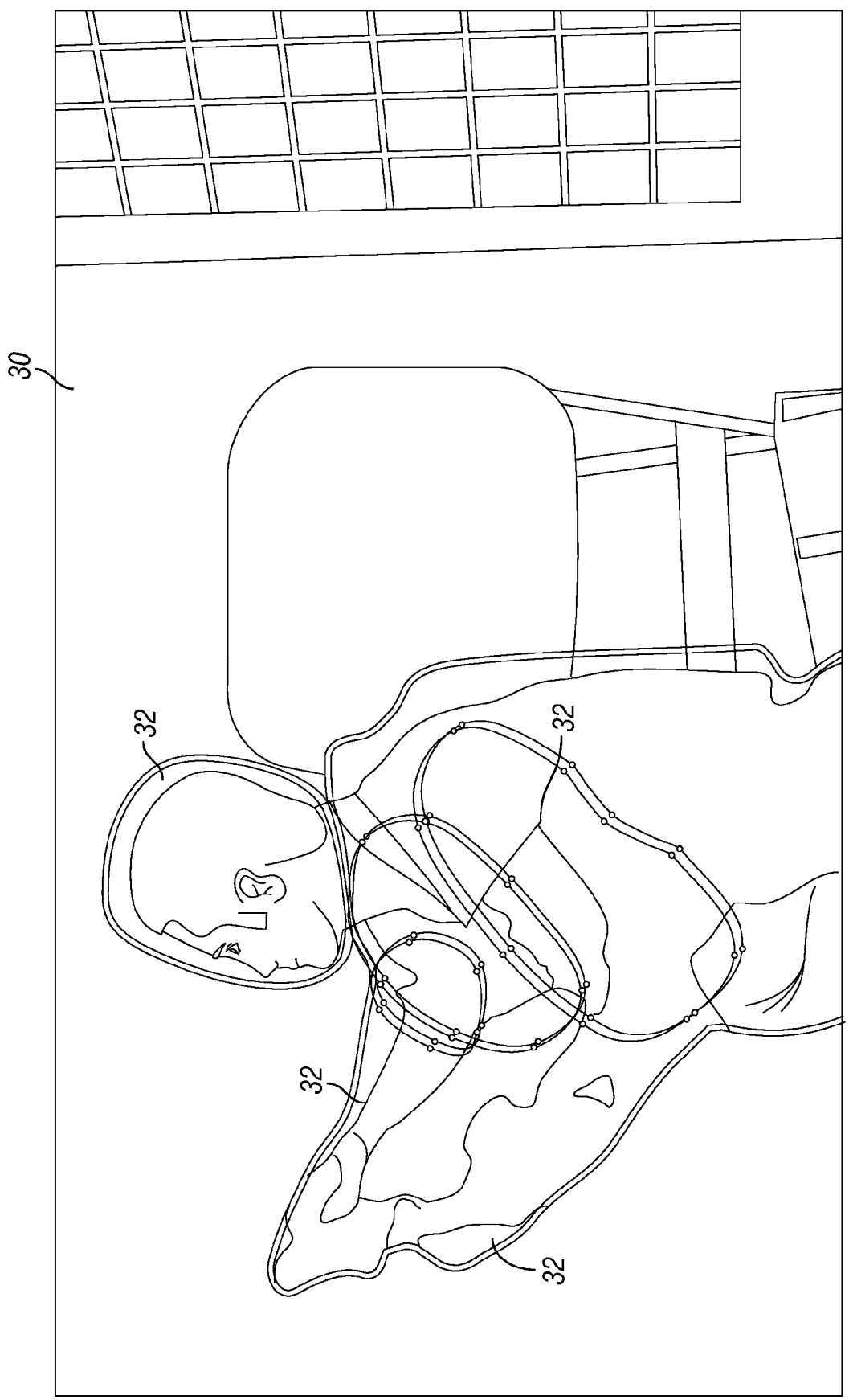
FIG. 6 shows a movie scene having a 24 frame per second standard background and higher frame rate motion elements in accordance with the present invention.

As alluded to above, in another embodiment of the present invention, photography will take place at 120 frames per second at 4K resolution to give as much motion data as needed. As will be readily appreciated, when filming at 120 frames per second, substantially clearer and less blurred action is stored than would be when filming at 24 frames per second. In order to display motion elements without blurring or strobing, however, while still maintaining the 24 frame per second film texture, it is contemplated to have different portions of the images running at different frame rates. In this regard, and as shown in FIG. 6, slow motion or static portions of the image 30, such as a background, may be retained at the 24 frame per second standard, while high frame rate motion elements 32 are embedded therein. Accordingly, just the fast motion elements of the frame or image may be filmed at a higher frame rate to retain clarity in that motion. As will be readily appreciated, and as shown in FIG. 6, this process allows a movie to be produced that combines both 24 frame per second and 60 frame per second elements when needed to ensure the clarity of moving elements.

In this embodiment, the original 120 frame per second material is retained as a "parallel sequence" and a 60 frame per second can be derived as well, as described above, to provide another "parallel sequence" that is in sync with the 24 frame per second sequence. These high data rate sequences can provide motion and image data in post-production as needed. In particular, these parallel sequences are used to extract high speed motion data that can be combined in post-production with the 24 frame per second sequence to provide high speed elements mixed into the scene such that the result has both the standard 24 frame per second film texture and the high resolution motion elements captured at 120 frames per second. This mixed image can then be viewed and projected such that it delivers the artistic merits of 24 frame per second film with the motion capture of 120 frames per second.

In connection with FIG. 6, and as alluded to above, the present invention, in a secondary embodiment, also contemplates automatically detecting sudden variations in pixel values, thus detecting motion and compensating for such motion by increasing the update rate of those pixels concerned—while leaving other areas of the frame at a conventional update rate of 24 frames per second.

Figure 7:
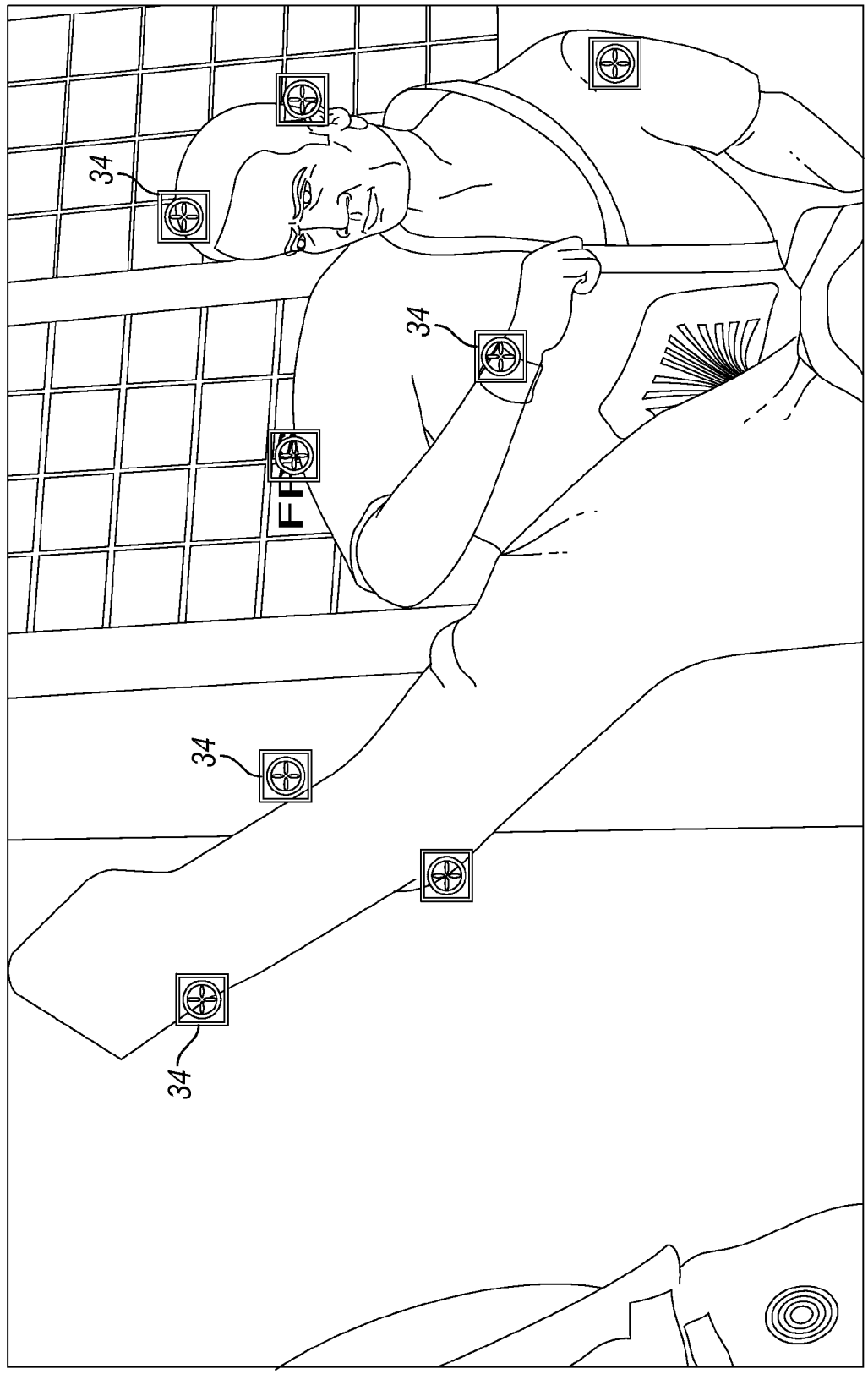
FIG. 7 illustrates a movie scene employing frame integrated motion analysis in accordance with the present invention.
Figure 12:
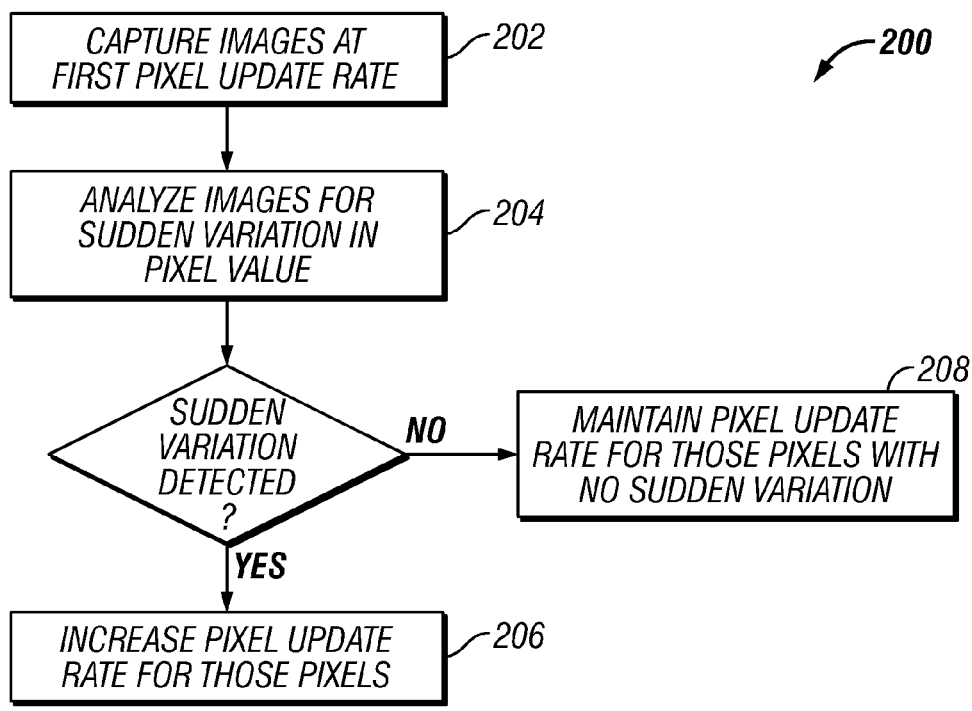
FIG. 12 is a schematic diagram illustrating a process for photographing moving images in accordance with an alternative embodiment of the present invention.

FIGS. 7 and 12 illustrate this process 200 of frame integrated motion analysis. As shown in FIG. 12, a scene may be filmed at a first pixel update rate in step 202, for example at the equivalent of 24 frames per second. A value for each pixel may be tracked over time, at step 204, such that a detection of a sudden variation in pixel value (in excess of a predetermined or set parameter) will indicate a fast moving image element such as a fist. FIG. 7 shows an example of a detection of sudden variations in pixel value as a result of the fast movement of image elements. Here, the value of pixels 34 on the actor's head, arm and leg during a martial arts move are detected as having a sudden variation. In response, the camera may automatically increase the pixel update rate for these image elements, at step 206, in this case to the equivalent of 60 frames per second. Indeed, in response to such detection of fast movement, the pixel update rate for those pixels may be increased commensurate with the velocity of the moving element. If no sudden variation in pixel value is detected, the pixel update rate for those pixels concerned (representing slow moving or static image elements) will be maintained at the original update rate, at step 208. As will be readily appreciated, this process automatically increases the clarity and impact of fast action elements while preserving the world standard of 24 frame film texture.

In connection with the above, the present invention contemplates collecting high-speed image data via a digital camera. Once this high-speed data is collected, it is then determined when to retain the additional pixel data as needed to display clear motion. In effect, sudden variations in motion are always detected, and the collected data that does not provide additional object or image motion is discarded. The automation of this process, as noted above, is similar to variable bit rate compression, where the data stream is wider when more data—hence a higher rate of change—is in the stream.

The concept of update rate of the pixels refers to the fact that if the subject being recorded by a particular pixel, in a fixed position, does not move or change, then the pixel will record the same value repeatedly during a given interval. The automated system would not record the same value, over and over, but would only record the changing values of the pixels that were changing. This embodiment is an expansion of codecs like AVC where the recording bit rate fluctuates, but the time base of the recording does not change. In AVC when you select 24 frames per second, 30 frames per second, or 60 frames per second, the codec records a variable rate based on the complexity of the scene, the subject and camera motion, but critically it does not provide any increase in temporal resolution whatsoever. Instead, the time-base of the recording is fixed. Indeed, the present invention records motion information based on rate of change, not a selected frame rate.

The detection and selection of pixels is similar to the film industry concept of "difference mattes." In this process, the images on a series of frames are compared to a similar series of images that may include an object that must be removed, like wires on a flying actor, or some other element. The images are compared, at the pixel level, and the pixels that are different from one shot to the next are removed. Similarly, the present invention compares the recorded images, at the pixel level, from the 24, 60 and 120 frame per second streams. The 24 frame per second stream has blur and more texture. The 60 frame per second stream has more sharpness and less texture. The 120 frame per second stream has a great deal more clarity. In the preferred embodiment the digital camera circuitry and software will quantify these differences and provide a systematic manner of achieving a particular, desired look for the final image by combining these data streams into one final stream for the audience to see. The formulas for quantifying these differences are the ratios expressed by these three streams, and the many combinations of data that could be formulated from these streams.

Figure 8:
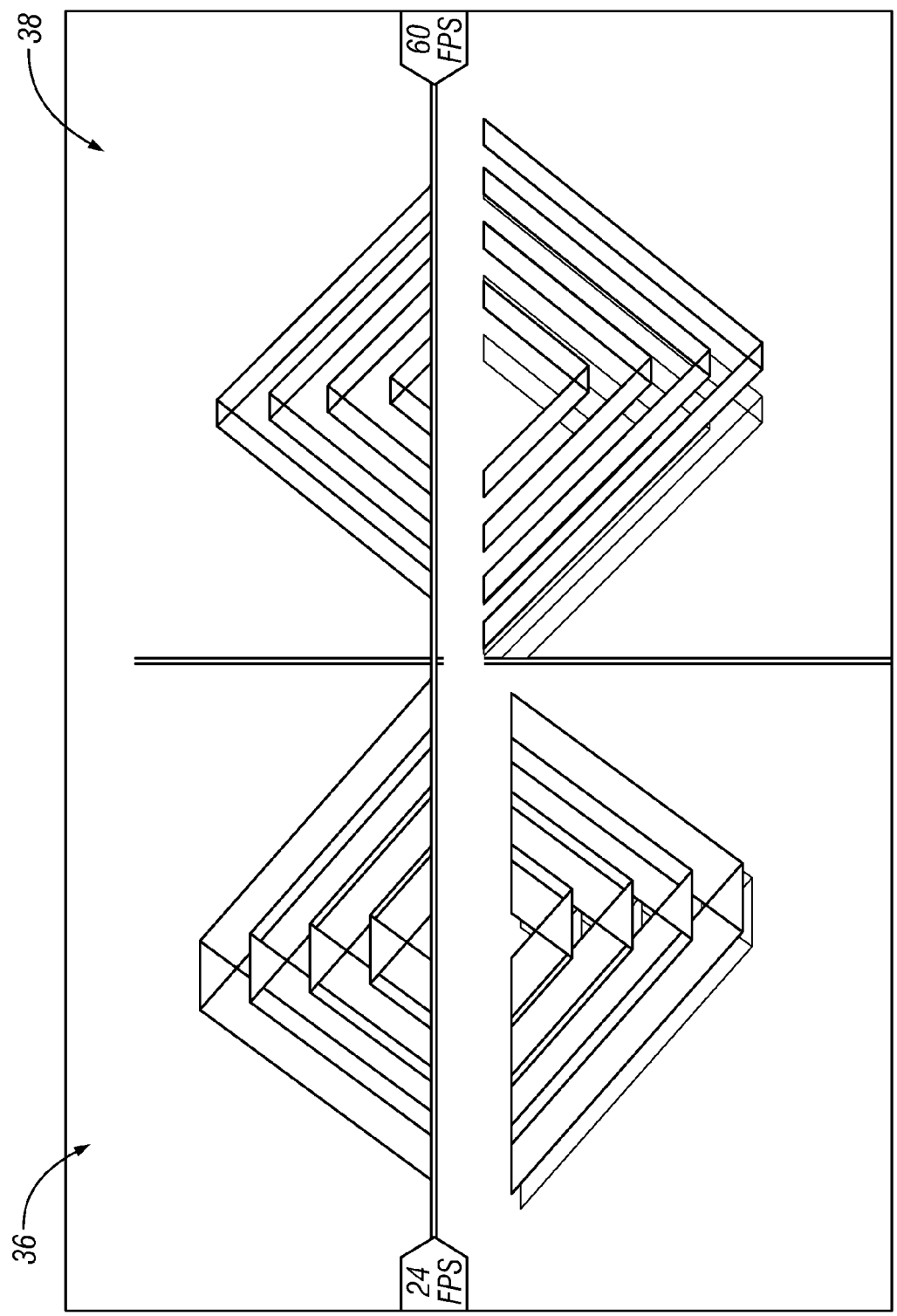
FIG. 8 illustrates the 3D image difference of frame to frame motion at 24 frames per second versus 60 frames per second.

Notably, the transition of filming to an all-digital medium is being driven by 3D, but 3D suffers even worse the shortfalls of 24 frames. Indeed, in addition to obvious blurring, frame to frame motion may cause the entire 3D effect to be lost. Accordingly the present invention is at least equally, if not more important, to filming in 3D. As discussed above, the 3D effect is created by the successful control of convergence and divergence, to simulate the view for each eye, so that a virtual 3D image is seen and integrated by the brain. If the images are blurred by motion, and the frame-to-frame motion displacement is more than the desired separation between left and right eye, the 3D effect is lost. Accordingly, the present invention solves these problems by minimizing blur and keeping left and right eye images distinct and optically coherent for the simulation of 3D space on the screen. Indeed, in 3D, because there are two films being projected, the present invention provides clearer and sharper images for each eye. As shown in FIG. 8 frame delineation of 3D images is show at 24 frames per second 36 and at 60 frames per second 38, in accordance with the present invention. As will be readily appreciated, frame delineation is lost at 24 frames per second while it is retained at 60 frames per second.

The most common digital projection systems today are using the Texas Instruments Digital Light Processing chips (DLP) that use a matrix of positionable micro mirrors to deliver imagery. It is well known that these chips can "switch" states of the micro mirrors at up to 144 Hz. They use a frame buffer that retains 24 frame material, so each frame may be flashed six times, or in the event of 3D, alternates between left and right imagery, showing each frame for three flashes. The present invention anticipates the introduction of a new type of frame buffer that can introduce new motion imagery on virtually every flash, thus resulting in extremely sharp and unblurred motion.

An additional anticipated aspect of this new technology involves issues related to potentially reduced signal to noise ratio, lowered bit depth, or other problems resulting from such brief exposures on a CCD or CMOS imager. However, we anticipate that in the process of "trading off" these issues with increased apparent sharpness and clarity (rather than blur) could more than make up for this. Also, in the process of merging several frames together, signal to noise could be improved. It is also possible to "trade off" resolution in exchange for motion clarity, for example reducing resolution from, say, 2K to 1K only in those fast action image zones. The human eye may still prefer, and not notice, such a process.

Figure 9:
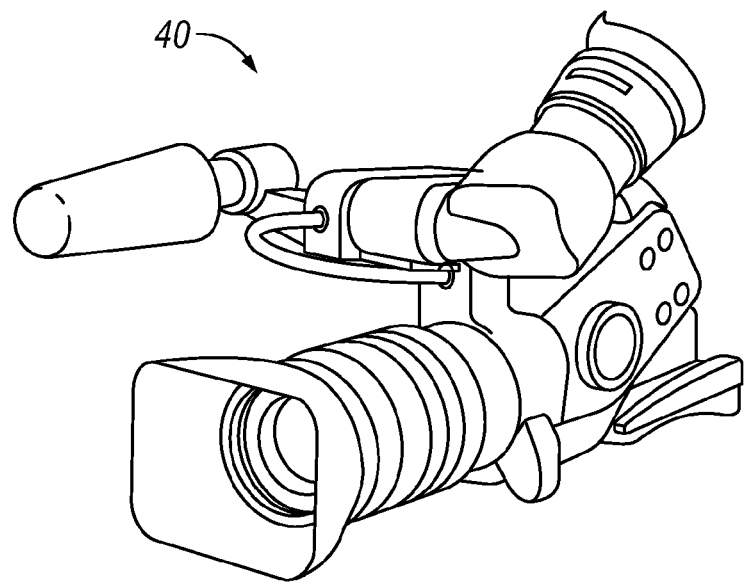
FIG. 9 illustrates an apparatus for photographing moving images in accordance with the present invention.
Figure 10:
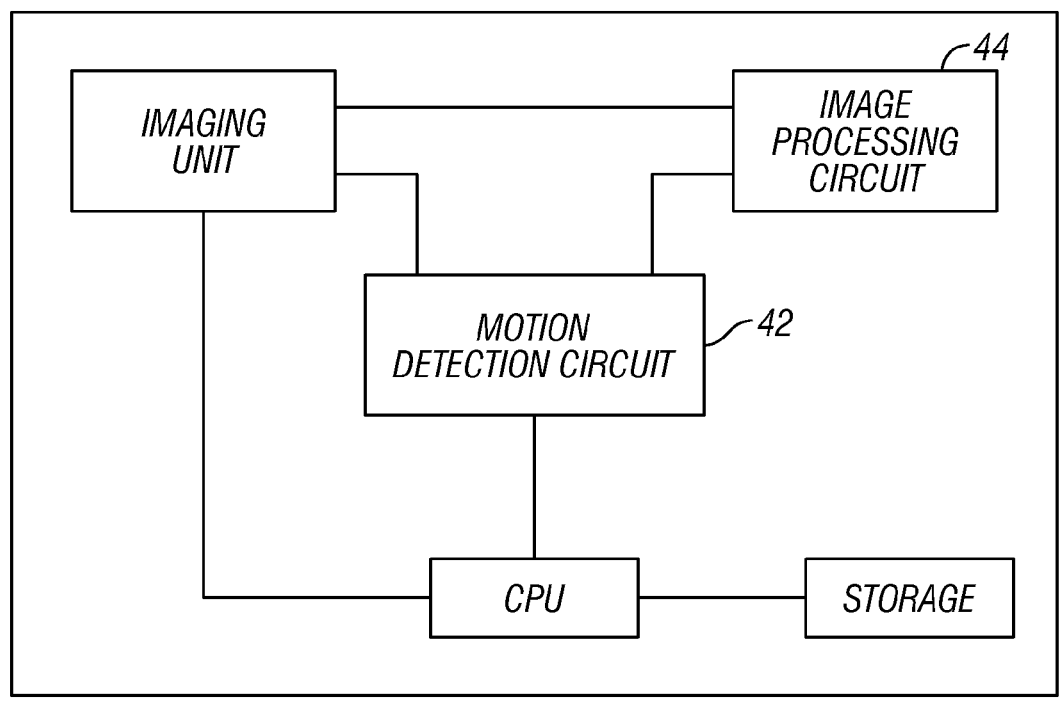
FIG. 10 schematically depicts the internal com.

As a further embodiment of the present invention, an apparatus for photographing and projecting moving images is provided. A digital camera 40 including appropriate motion detection methodologies in the form of algorithms and circuits within the camera that automatically perform the appropriate image compression, as described above, is shown in FIG. 9. The camera may be of the type known in the art and further includes a motion detection circuit 42 for detecting fast moving image elements and an image processing circuit 44 for increasing or decreasing the pixel update rate in response to the frame integrated motion analysis, as described above.

The expected result of the invention will be the advent of a digital motion picture standard that contains within it the desires of both filmmakers and cinema viewers to deliver the "cinema texture" that they expect, but with all of the objectionable artifacts of blurring, strobing, limited screen brightness, and loss of stereoscopy for 3D removed and corrected. The invention will facilitate the production of films with unlimited action potential, as well as unlimited screen size and brightness. The invention anticipates the inclusion of motion/action that may exceed the 60 frames per second rate of Showscan, with fast action components updated on every flash, rather than the objectionable double shuttering of film. Overall, this invention will result in an increased sense of audience excitement and stimulation, which is expected to be measurable via electromyogram, electroencephalogram, galvanic skin response, electrocardiogram, and possibly even Functional Magnetic Resonance Imaging.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A method for photographing and projecting moving images, comprising the steps of:
   capturing an image at a first frame rate, said image having at least one slow moving/static element and at least one fast moving element;
   analyzing said image for motion/velocity components to detect said at least one fast moving element;
   reducing said at least one slow moving/static element to a second frame rate, said second frame rate being slower than said first frame rate; and
   retaining said at least one fast moving element at said first frame rate.

2. The method of claim 1, wherein said first frame rate is 120 frames per second.

3. The method of claim 1, wherein said first frame rate is 60 frames per second.

4. The method of claim 1, wherein said first frame rate is 100 frames per second.

5. The method of claim 2, wherein said second frame rate is 24 frames per second.

6. The method of claim 2, wherein said second frame rate is one of 60, 40 and 30 frames per second.

7. The method of claim 4, wherein said second frame rate is one of 75, 50 and 25 frames per second.

8. The method of claim 5, wherein said step of reducing said at least one slow moving/static element to 24 frames per second comprises:
   dividing a 120 frame sequence into twenty-four groups of five sequential frames;
   digitally combining the first three frames of each group; and
   deleting the next two frames of each group.

9. The method of claim 6, wherein said step of reducing said at least one slow moving/static element to 60 frames per second comprises:
   deleting every other frame from a 120 frame sequence.

10. The method of claim 1, wherein said steps are performed by a digital camera.

11. A method for photographing and projecting moving images, said moving images including a plurality of pixels, each pixel having a pixel value, said method comprising the steps of:
   capturing said moving images at a first pixel update rate;
   detecting a sudden variation in the pixel value for at least one of said plurality of pixels;
   increasing said first pixel update rate for said at least one of said plurality of pixels to a second pixel update rate, said second pixel update rate being faster than said first pixel update rate; and
   capturing said at least one of said plurality of pixels at said second pixel update rate and said pixels not exhibiting the sudden variation in pixel value at said first pixel update rate.

12. The method of claim 11, wherein the step of detecting a sudden variation in pixel value comprises:
   detecting a first value for said at least one of said plurality of pixels;
   detecting a second value for said at least one of said plurality of pixels at a point later in time;
   comparing said second value to said first value to determine if a result of said comparison exceeds a predetermined parameter.

13. The method of claim 11, wherein said at least one of said plurality of pixels is a group of pixels representing a moving object.

14. The method of claim 13, wherein said first pixel update rate is 24 frames per second.

15. The method of claim 14, wherein said second pixel update rate is 60 frames per second.

16. The method of claim 14, wherein said second pixel update rate is 120 frames per second.

17. The method of claim 11, wherein all of said steps are carried out by a digital camera.

18. An apparatus for photographing and projecting moving images, comprising:
   a means for capturing an image at a first frame rate, said image having at least one slow moving/static element and at least one fast moving element;
   a motion detection circuit for detecting said at least one fast moving element; and
   an image processing circuit for reducing said at least one slow moving/static element to a second frame rate, said second frame rate being slower than said first frame rate.

19. The apparatus of claim 18, wherein said first frame rate is 120 frames per second.

20. The apparatus of claim 19, wherein said second frame rate is 24 frames per second.

* * * * *